Figure 1:
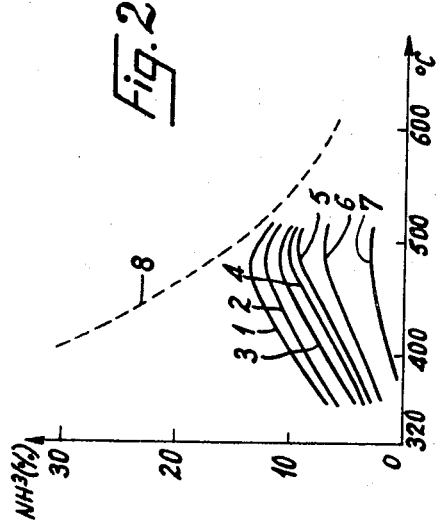

United States Patent [19]

Senes et al.

[11] 3,839,229
[45] Oct. 1, 1974

[54] AMMONIA-SYNTHESIS CATALYST
[75] Inventors: Michel Senes, La Baule; Michel Pottier; Jean-Francois Gourdier, both of Saint Nazaire, all of France
[73] Assignee: Societe Chimique De La Grande Paroisse, Azote Et Produits Chimiques, Paris, France
[22] Filed: Mar. 14, 1972
[21] Appl. No.: 234,625

[30] Foreign Application Priority Data
Mar. 17, 1971 France.............................. 71.09265

[52] U.S. Cl.............. 252/455 R, 252/459, 252/462, 252/466 J, 252/472, 423/362
[51] Int. Cl............................................ B01j 11/22
[58] Field of Search........ 252/472, 455 R, 459, 462, 252/466 J; 423/362

[56] References Cited
UNITED STATES PATENTS
3,243,386    3/1966    Nielsen et al................... 423/362 X
3,644,216    2/1972    Egalon et al..................... 252/472 X
3,653,831    4/1972    Burnett............................. 423/362

FOREIGN PATENTS OR APPLICATIONS
19,249     8/1910    Great Britain...................... 252/472
227,491    1/1925    Great Britain...................... 252/472
822,867    11/1959   Great Britain...................... 252/472

Primary Examiner—Daniel E. Wyman
Assistant Examiner—W. J. Shine
Attorney, Agent, or Firm—Browdy and Neimark

[57] ABSTRACT

The present invention relates to ammonia-synthesis catalysts. The novel catalysts, in the oxidized state, contain iron oxide having a degree of oxidation corresponding to $Fe_3O_4$, and cobalt introduced in the form of salts, carbonates or oxides; the content by weight expressed as cobalt is 5 to 10 percent.

10 Claims, 7 Drawing Figures

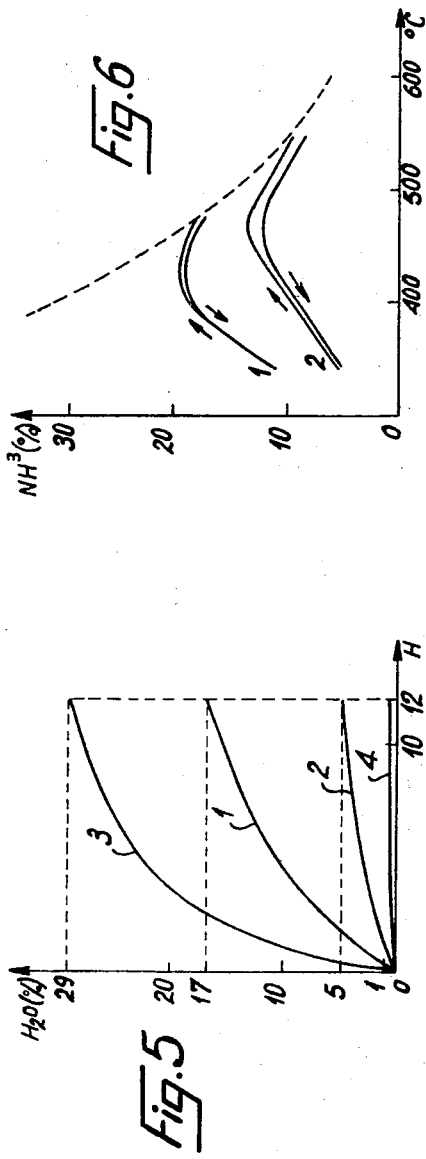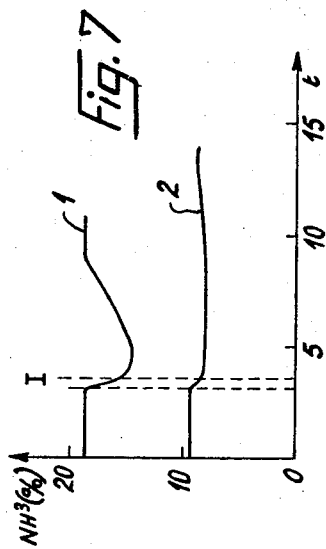

AMMONIA-SYNTHESIS CATALYST

The present invention relates to catalysts for the synthesis of ammonia from hydrogen and nitrogen, and more particularly for low temperature synthesis.

Industrially manufactured ammonia is obtained from the synthesis of the mixture of hydrogen and nitrogen in stoichiometric proportions depending on the exothermal reaction $$N_2 + 3H_2 \rightleftarrows 2NH_3$$

Chatelier's laws show that the formation of ammonia is promoted by an increase in pressure or a diminution in temperature. In the case of industrial catalysts, at ambient temperature, the reaction velocity is practically zero and it is for this reason that the reaction is effected between 375° and 500°C under pressures ranging between 150 and 300 kg/cm².

In an ammonia synthesis process, for diminishing the pressure it is necessary to decrease the temperature in order to obtain the same $NH_3$ conversion rate. The advantages of functioning at low pressure are manifold, such as a diminution in the thickness of the walls of the reactors and of the pressure tubes, an increase in the capacity of the reactors (this affording an increase in the production capacity), a diminution in the overall investment costs, in particular a diminution in the cost of the compressors and, consequently, a diminution in the cost of energy, which has an influence on the cost price of the manufactured ammonia. Conventional commercial catalysts contain, mainly, iron generally at a degree of oxidation corresponding to $Fe_3O_4$, and small proportions of oxides which are difficult to reduce, such as oxides of potassium, aluminium and other elements, known as promotors or activators. U.S. Pat. No. 1,771,130 of the 29th March, 1927 had already proposed iron catalysts having four promotors such as $K_2O$, CaO, MgO and $Al_2O_3$. Some associations of promotors render the reduction of the catalyst to the oxidized state more difficult, and it should be effected externally of the synthesis reactor. Furthermore, it is frequently necessary to subject the reduced catalyst to stabilization treatment. It will readily be appreciated that such supplementary treatment increases the cost price of the ammonia prepared.

It has already been proposed to prepare ammonia synthesis catalysts from oxides of cobalt, nickel, manganese, chromium, molybdenum, tungsten, uranium or compounds of these metals capable of affording the corresponding oxide, employed along or with iron compounds, notably in British Specification No. 227,491. It is known, on the other hand, that these oxides, when employed alone, do not have catalytic properties which are superior to those of the iron oxides. On the contrary, Mittash (Advances in Catalysis II, 82, 1950) and British Specification No. 822,867 have shown that the cobalt catalysts are much less active than the iron catalysts. Also known are catalysts obtained from an iron-cobalt alloy heated in oxygen to 600°–700°C and then fused with conventional promotors, such as alumino-potassium-silica, in a resistance furnace. It is known on the other hand that the catalytic activity of the Fe-Co alloys for the decomposition of ammonia, the reaction mechanism of which is comparable with that of ammonia synthesis, cannot be tied to the cobalt concentration of the alloy (Y. N. Artyukh, Scientific Selection of Catalysts, 1966, page 214). Fe-Co alloy has two activities maxima, the first at approximately 15 percent of cobalt and the second at approximately 50 percent of cobalt. These observations have been effected with regard to Fe-Co alloys prepared by fusion under argon.

According to the present invention, there have been found synthesis catalysts which are highly active at low temperatures, particularly between 200° and 400°C. The high degree of activity of the novel catalysts permits the passage of volumetric velocities of higher value than in the case of conventional catalysts; the volumetric velocities may attain 200,000, expressed as mixture inflow rate in Nl/h/volume of catalyst in liters. The catalysts of the present invention maintain their entire superiority at low volumetric velocities. The said catalysts possess a high degree of resistance to impurities. The physical characteristics, i.e., the thermal stability and the mechanical resistance, of the novel catalysts are extremely good. The considerable importance of a catalyst having a high hardness value and affording good resistance to attrition will be appreciated, if it is realized how extremely important it is to diminish the quantity of dust produced by the catalyst during the reaction and if, furthermore, the influence of the resistance to attrition on the mechanical longevity of the catalyst charge is known.

It has been found that the catalysts constituting the subject of the present invention are reduced in a very rapid and very complete manner, and this is a very appreciable advantage. According to the invention, it has been discovered that incorporation of a considerable content of a suitable metal in a conventional iron oxide catalyst having a degree of oxidation corresponding to magnetite $Fe_3O_4$ imparts thereto a structure which is particularly favorable for the reduction of the iron oxide and for the constitution of the active sites accessible in a large number for the reactants. The velocity of combination of the oxygen atoms of the iron with the reducer is extremely important, since it defines the specific surface, the distribution of final porosity, and the lacunary structure of the crystalline edifice.

The addition of cobalt in the form of salts, carbonates or oxides during preparation of the catalyst permits the creation of a novel crystalline structure. In the case of low contents, the cobalt influence is not very clearly marked but it becomes very considerable from 5 percent on. The preferred metal cobalt content is between 5 and 10 percent, that of magnetite ranging between 90 and 95 percent.

According to a variant of the invention, the cobalt is added to an ammonia synthesis catalyst of conventional type constituted essentially, in the oxidized state, by magnetite $Fe_3O_4$, with which are associated a plurality of conventional promotors, i.e., at least three thereof. The said promotors are of the textural, structural, electronic type, such as alumina $Al_2O_3$, silica $SiO_2$, zirconia $ZrO_2$, magnesia MgO, lime CaO, potassium oxide $K_2O$ and the rare earth metal oxides. The preferred overall content in respect of promotors ranges between 1 and 6 percent, whereas that in respect of magnetite ranges between 99 and 94 percent.

It should be noted that the introduction of cobalt permits the obtaining of excellent catalysts, even in the absence of promotors.

The catalysts of the invention are obtained in simple manner. Their preparation comprises the mixing of the constituents, fusion of the mixture and, after cooling, granulation. The mode of combining the iron oxide, the principal element, and cobalt oxide, and the cobalt oxide content play a decisive part in the efficacy of the catalyst relative to ammonia synthesis. According to the invention, the cobalt is introduced in the form of a compound such as a salt, oxide, carbonate, in order to afford a solid solution of cobalt oxide in iron oxide. The properties of the solid solutions $Fe_3O_4$ - $CoO$ are very different from those of the metallic alloys Fe-Co. In the case of solid solutions $Fe_3O_4$ - $CoO$ prepared by oxidizing fusion, the influence of the cobalt concentration on the catalytic properties is not the same as in the case of metal alloys Fe-Co. The catalyst grains may be utilized directly in a reactor.

According to a variant of the invention, it is possible to pre-reduce and stabilize the catalyst by surface nitridation or oxidation before employing the reactor. Such pre-reduction is effected in accordance with a technique which is well known to the person skilled in the art.

According to a further variant of the invention, it is possible to associate the novel catalyst with at least one bonding agent selected from the group of the argillaceous, magnesium and alumina bonding agents. The said catalysts are obtained associated with a bonding agent by proceeding to the preparation of a paste from a catalyst which may or may not contain a finely crushed, powdered promotor, of the order of 200 microns, for example, with 10 to 60 percent by weight of bonding agent. After drying the paste thus obtained, the product is granulated and then made up in the form of pastilles or small balls by the conventional mechanical compacting processes.

The employment of the catalysts according to the invention permits the preparation of ammonia by contacting the said catalysts with a mixture of hydrogen and nitrogen in a ratio 3:1, at volumetric velocities comprised between 10,000 and 200,000, preferably between 50,000 and 100,000, at a temperature ranging between 200° and 550°C, preferably near 350°C, under a pressure ranging between 80 and 350 bars, preferably 150 bars. The ammonia is obtained with excellent conversion rates which may attain as much as 29 percent.

Some examples illustrating the invention purely non-limitatively are given hereinbelow.

Example 1:

The catalyst A is prepared, with the following composition:
Catalyst A:

| Magnetite | $Fe_3O_4$ | 92 % by weight |
| Potassium oxide | $K_2O$ | 1 % by weight |
| Cobalt oxide | $CoO$ | 7 % by weight |

After having mixed these constituents, fusion is effected at approximately 1,400°C, followed by granulation. The grains obtained may be directly utilized in a reactor.

Example 2:

Fine crushing to a powder of approximately 200 microns of catalyst A is effected, then it is prepared in the form of a paste with 10 to 60 percent of argillaceous and/or magnesia and/or alumina bonding agent. After drying the said paste, the product obtained is granulated and then put into the form of pastilles or small balls by the conventional compacting processes.

In the case of the example, the catalyst B contains 10 percent of aluminous cement.

Example 3:

a. Activity test No. 1:

A comparative test is effected between the catalyst A, prepared in accordance with Example 1, and an industrial catalyst designated GP 7 having the following composition:

| GP 7·$Fe_3O_4$ | 94 % by weight |
| $Al_2O_3$ | 2 % by weight |
| $CaO$ | 3.1 % by weight |
| $K_2O$ | 0.9 % by weight |

The test conditions are as follows : pressure : 150 bars; composition of the mixture introduced : nitrogen of 25 percent volume, hydrogen of 75 percent volume; synthesis temperatures : 320°–550°C; volumetric velocities VVH, expressed as introduced mixture rate in Nl/h/volume of catalyst in liters : 10,000–200,000.

Figure 2:
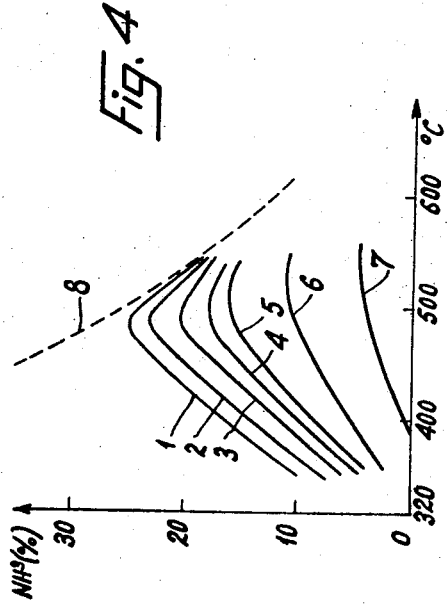
Figure 3:
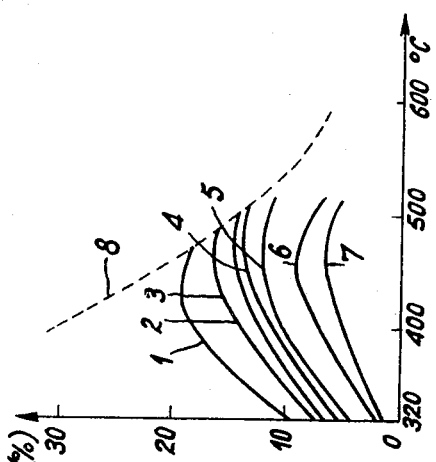
Figure 4:
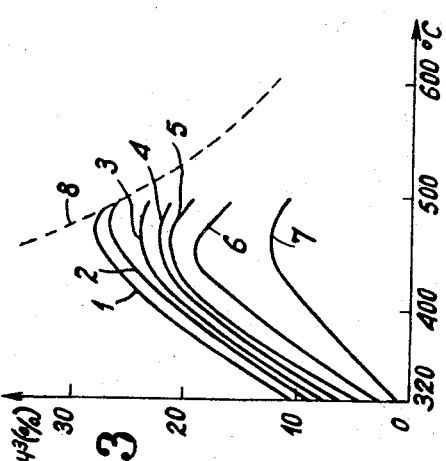

The activity of the catalyst is measured by the $NH_3$ content, as volume in the mixture at outflow, in one passage without recycling. The results are shown in the family of curves of FIGS. 1 and 2. The synthesis temperatures in degrees Centigrade °C are plotted in abscissae. The catalyst activity expressed as a percentage of $NH_3$ (outflow volume percent $NH_3$) is plotted in ordinates. The curves 1 to 7 correspond to the different volumetric velocities VVH : Curve 1 corresponds to a VVH of 10,000; curve 2 corresponds to a VVH of 20,000; curve 3 corresponds to a VVH of 30,000; curve 4 corresponds to a VVH of 40,000; curve 5 corresponds to a VVH of 60,000; curve 6 corresponds to a VVH of 100,000; and curve 7 corresponds to a VVH of 200,000. Curve 8, in dotted lines, represents equilibrium. FIG. 1 shows the activity of the catalyst A according to the invention. FIG. 2, which is a comparative figure, shows the activity of the catalyst GP 7. A study of the curves of FIGS. 1 and 2 shows clearly the greater activity of catalyst A, notably at low temperatures. In respect of catalyst A, at 10,000 VVH and 340°C, 12 percent $NH_3$ is obtained, whereas the conventional catalyst GP 7 begins to react only starting from 350°C. Similar tests effected on catalyst B according to the invention afford practically speaking superpositioning of the results with catalyst A.

b. Activity test No. 2:

The conditions of activity test No. 1 are repeated for catalysts A and GP 7, but effecting the synthesis under a pressure of 300 bars. The results obtained are shown in the family of curves 1 to 7 of FIGS. 3 and 4. The volumetric velocities are comparable with those of activity test No. 1 and, as before, the temperatures °C on the abscissae and the percent $NH_3$ on the ordinates, and the curve 8 corresponds to equilibrium. A comparison of the curves of FIGS. 3 and 4 shows the very clear superiority of the catalyst A. For example at 10,000 VVH and 400°C, 23 percent is obtained as against 16 percent for the industrial catalyst. The catalyst B behaves in a manner identical with that of catalyst A.

Example 4:

Study of the speed of reduction of the catalysts

A series of tests is effected on samples of the industrial catalyst GP 7 and on samples of the catalyst A.

Test No. 3a:

A sample of the industrial catalyst GP 7, which is disposed in a reactor in situ, is subjected to the following conditions : temperature 400°C; VVH 100,000; pressure 1 bar; composition by volume of the inflowing mixture ($-N_2$ 25 percent, $H_2$ 75 percent by volume); duration of the test 12 hours.

In this test, there is regularly measured the quantity of water resulting from the combination of the oxygen extracted from iron oxide with the reducing hydrogen. The results are shown on the curve 1 of FIG. 5. The quantity of water formed, expressed as a percentage of cumulative water, percent $H_2O$, is plotted on the ordinate and the duration in hours is plotted on the abscissa.

Immediately after this reduction treatment, an activity measurement in respect of the catalyst GP 7 is effected under the following synthesis conditions: temperature 400°C; VVH 100,000; pressure 150 bars; composition of the inflowing mixture ($-N_2$ 25 percent, $H_2$ 75 percent by volume); duration of the synthesis: temperature increase 30 minutes then stable temperature level during 30 minutes. The $NH_3$ content formed in the outflowing mixture is measured, after maintaining the temperature stable for 30 minutes. An $NH_3$ content of 2.4 percent is obtained.

Test No. 3b:

The catalyst GP 7 is, after the activity test, subjected to a fresh reduction test under the conditions of test 3a, during a new duration of 12 hours. The results obtained are shown on curve 2 of FIG. 5, and the percentage of water continuing to be formed is 5 percent. There is then effected a fresh activity measurement based on the same $NH_3$ synthesis conditions as in test No. 3a. There is obtained an $NH_3$ content, formed in the outflowing mixture, of 2.9 percent. In conclusion, the continuation of water formation in test 3b and the obtaining of a higher $NH_3$ percentage in the same test proves that the industrial catalyst GP 7 was not completely reduced and consequently had not achieved its stabilization at the end of the first 12 hours. Taking into account the theoretical water quantity to be extracted, which is approximately 30 percent, it may be concluded that after the two successive reductions totalling 24 hours there were obtained only 22 percent of water formed, in all. Thus, the industrial catalyst is imperfectly reduced after 24 hours.

Test No. 3c:

A sample of the catalyst A prepared in accordance with Example 1 is subjected to reduction, strictly under the same conditions as in test 3a, the results being shown on the curve 3 of FIG. 5. Comparing tests 3a and 3c, the considerable difference in the affinity of hydrogen for oxygen of the catalyst according to the invention will be noted. In test 3c, the percentage of water formed increases to 29. There is then effected, as previously, an activity test under the same synthesis conditions as in test 3a. An $NH_3$ content, in the outlet mixture, of 6.9 percent is obtained.

Test No. 3d:

The catalyst A is recovered and an identical reduction test is effected during a further 12 hours, as in test 3b. The quantity of water produced is indicated on curve 4 of FIG. 5. Practically speaking, no water is produced, i.e., hardly 1 percent at the end of 12 hours. The catalyst A is then subjected to a further activity test under the same synthesis conditions as in tests 3a and 3c. The $NH_3$ content formed in the outlet mixture is measured after maintaining the stable temperature for 30 minutes. A content of 7 percent is obtained. In conclusion, tests 3c and 3d show that the catalyst A of the invention has been totally reduced. In fact, after the two successive reductions (a total of 24 hours) there are obtained 30 percent of water formed, this corresponding practically to all the water which could possibly form. On the other hand, the activity tests show that the $NH_3$ content is constant, so that the catalyst was stabilized from the twelfth hour on.

Example 4:

Thermal resistance and ageing:

The test consists in applying overheating to the catalyst during reaction and then returning to the temperature obtaining prior to overheating. The diminution in the $NH_3$ content, formed before and after overheating, is a means for evaluating the ageing of the catalyst. Two reactors are charged with the following catalysts: reactor 1 — catalyst A according to the invention; reactor 2 — industrial catalyst GP 7. After total reduction of the two catalysts, the ageing tests are effected under the following conditions: pressure 150 bars; composition of the entry mixture in Volume $N_2$ - 25 percent, $H_2$ 75 percent by volume; VVH = volumetric velocity expressed as flow rate of entering mixture in Nl/h/catalyst volume in liters = 10,000. Temperature: increasing by "maintained levels" from 350° to 550°C; maintained level at 500°C - duration 30 minutes; decreasing by maintained levels from 550° to 350°C. The results obtained are shown in curves 1 and 2 of FIG. 6. The temperatures are plotted in abscissae, in degrees Centigrade (°C), the $NH_3$ yield is expressed as percent $NH_3$ in the exit mixture, plotted in ordinates. The curve in dotted lines corresponds to equilibrium. The curves 1 correspond to the catalyst A (reactor 1) and the curves 2 to the catalyst GP 7 (reactor 2).

Example 5:

Resistance to impurities:

It is known that the impurities, contained for example by oxygen, and accidentally present in the synthesis mixture have an effect on the catalyst activity. These impurities are, in the case of oxygen: $O_2$, $H_2O$, CO, $CO_2$; depending on their concentration in the synthesis mixture, their action is of greater or lesser importance. The test consists in injecting the impurity into the mixture entering over the catalyst, during reaction and during a predetermined duration. Any decrease in the $NH_3$ content, formed before and after injection of the impurity, is measured. After cessation of the injection of the impurity, the velocity of return to the initial $NH_3$ formed content is also measured; Two reactors are charged with the following catalysts: reactor 1 - catalyst A; reactor 2 - industrial catalyst GP 7. After total reduction of the two catalysts, tests with regard to the resistance to poisons are effected under the following conditions: pressure 150 bars; composition of the entry mixture ($N_2$ 25 percent, $H_2$ 75 percent by volume); volumetric velocity VVH = 10,000; temperature 400°C; injection of 200 mg of poison expressed in oxygen per $Nm^3$ of mixture at entry; duration of the injection 30 minutes. The comparative results are expressed on the curves of FIG. 7. Curve 1 corresponds to catalyst A of the invention. Curve 2 corresponds to the reference catalyst GP 7. The times (t) are plotted on abscissae in hours, the ammonia percentages (percent $NH_3$) are plotted on the ordinates. The duration of injection is shown and it corresponds to 1. A study of curves 1 and 2 shows that the catalyst of the invention has returned to the prior conditions at the end of 5 hours, whereas the reference catalyst has not yet returned after 10 hours.

Example 6:

Mechanical strength test:

Comparative tests are effected in respect of catalyst A and reference catalyst GP 7. The test is effected in the following manner. A predetermined volume of the catalyst is taken. The sample is introduced into a horizontal cylinder rotating at constant speed. The catalyst grains roll on each other and powder is formed by attrition. After predetermined time, the movement of rotation is halted, the catalyst is screened, the dust is weighed and expressed as a weight percentage relative to the initial sample. The results obtained are shown hereinbelow:

| I Catalyst A | II Catalyst GP 7 |
|---|---|
| Volume 500 ml | Volume 500 ml |
| Grain size 5/10 mm | Grain size 5/10 mm |
| Dust formed 0.3 % | Dust formed 1.02 %. |

The catalyst A of the invention exhibits a greater degree of solidity than the reference catalyst.

Example 7:

Comparative tests are effected with regard to the efficacy of various catalysts wherein the cobalt content varies between 0 and 13.5 percent.

The tests are effected under the following experimental conditions : composition of the inflowing synthesis mixture:

$N_2 + 3 H_2$ nitrogen by volume 25 percent, hydrogen by volume 75 percent; pressure 300 bars; VVH 20,000; temperature 400°C. The activity of the catalyst is measured by the $NH_3$ content by volume in the mixture, at the outlet, in one passage without recycling.

| Catalyst | Co content in % | $NH_3$ content % |
|---|---|---|
| GP 7 | 0 | 14.5 |
| Catalyst C | 2.5 | 17.1 |
| D | 5.5 | 20.2 |
| E | 8.2 | 20.3 |
| F | 13.5 | 18.2 |

A study of these results will show the critical range of the cobalt content.

What we claim is:

1. An ammonia synthesis catalyst consisting essentially of a solid solution of iron oxide, at a degree of oxidation corresponding to $Fe_3O_4$, and CoO, said CoO being present in an amount of 5 to 10 percent by weight expressed as cobalt.

2. An ammonia synthesis catalyst according to claim 1, further including, as part of the solid solution, a promotor selected from the group consisting of alumina, silica, zirconia, magnesia, lime, potassium oxide and rare earth metal oxides, the content of which ranges between 1 and 6 wt. percent.

3. An ammonia synthesis catalyst composition in pastille or small ball form and including the solid solution of claim 1 comprising, in addition to said solid solution, at least one bonding agent selected from the group consisting of the argillaceous, magnesia and alumina bonding agents, the proportion of bonding agent by weight being between 10 and 60 percent.

4. An ammonia synthesis catalyst consisting essentially of a catalyst in accordance with claim 1 which has been subjected to surface oxidation or nitridation.

5. A process for the preparation of an ammonia synthesis catalyst consisting of:
mixing $Fe_3O_4$ and cobalt in the form of a salt, carbonate or oxide compound in amounts sufficient to yield a solid solution of $Fe_3O_4$-CoO after fusion having 5 – 10 weight percent of cobalt; and
fusing into a solid solution.

6. A process in accordance with claim 5 wherein said fusing step is accomplished by heating to approximately 1,400°C.

7. A process in accordance with claim 5 further including the steps of cooling the solid solution and granulating.

8. A process in accordance with claim 5 further including the steps of crushing the solid solution to a powder, preparing the powder in the form of a paste with 10–60 weight percent of argillaceous, magnesia or alumina bonding agent, drying the paste, granulating, and compacting the granulated dry paste into the form of pastilles or small balls.

9. A process in accordance with claim 5 wherein said mixing step includes the addition of 1 – 6 percent by weight of a promoter selected from the group consisting of alumina, silica, zirconia, magnesia, lime, potassium oxide, and rare earth metal oxides.

10. A process in accordance with claim 5 further including the step of subjecting the solid solution to surface oxidation or nitridation.

* * * * *